United States Patent
Korper

[19]

[11] Patent Number: 5,964,931
[45] Date of Patent: Oct. 12, 1999

[54] CORRECTION FLUID MARKER AND FORMULATION FOR FLUID

[75] Inventor: George W. Korper, Glenelg, Md.

[73] Assignee: Correct Solutions, Corp., Dayton, Md.

[21] Appl. No.: 09/222,837

[22] Filed: Dec. 30, 1998

Related U.S. Application Data

[60] Provisional application No. 60/070,233, Dec. 31, 1997, provisional application No. 60/070,524, Jan. 6, 1998, provisional application No. 60/070,895, Jan. 8, 1998, and provisional application No. 60/071,481, Jan. 13, 1998.

[51] Int. Cl.$^6$ .................................................. C09D 10/00
[52] U.S. Cl. ........................... 106/31.93; 106/31.64; 106/31.66; 106/31.9
[58] Field of Search ................. 106/31.93, 31.6, 106/31.66, 31.9

[56] References Cited

U.S. PATENT DOCUMENTS

| | | | |
|---|---|---|---|
| 6,883 | 11/1849 | Jordan | 401/235 |
| 2,673,362 | 3/1954 | Robinson | 401/186 |
| 3,349,966 | 10/1967 | Schwartzman | 401/41 |
| 3,459,484 | 8/1969 | Abrams | 401/206 |
| 3,464,775 | 9/1969 | Beal | 401/199 |
| 3,538,208 | 11/1970 | Ohtsuka | 401/199 |
| 3,565,540 | 2/1971 | Andrews | 401/115 |
| 3,609,052 | 9/1971 | Airosus | 401/199 |
| 3,617,325 | 11/1971 | Spokes et al. | 401/198 |
| 3,778,495 | 12/1973 | Woolley | 401/265 |
| 3,942,903 | 3/1976 | Dickey et al. | 401/198 |
| 4,157,874 | 6/1979 | Durand | 401/4 |
| 4,165,988 | 8/1979 | Page et al. | 106/31.93 |
| 4,238,162 | 12/1980 | Sherwood | 401/198 |
| 4,269,526 | 5/1981 | Dupre | 401/198 |
| 4,447,169 | 5/1984 | Vartoughian | 401/269 |
| 4,747,419 | 5/1988 | Flynn et al. | 401/206 |
| 4,923,317 | 5/1990 | Bishop et al. | 401/205 |
| 5,035,525 | 7/1991 | Konose | 401/278 |
| 5,123,766 | 6/1992 | Babiak | 401/180 |
| 5,199,976 | 4/1993 | Yau et al. | 106/31.93 |
| 5,256,191 | 10/1993 | Thompson et al. | 106/31.93 |
| 5,277,510 | 1/1994 | Okamoto et al. | 401/214 |
| 5,338,775 | 8/1994 | Matz et al. | 106/31.93 |
| 5,342,136 | 8/1994 | Fukami | 401/135 |
| 5,368,810 | 11/1994 | Draper et al. | 264/523 |
| 5,468,082 | 11/1995 | Hori | 401/4 |
| 5,500,455 | 3/1996 | Terakawa | 523/161 |
| 5,516,223 | 5/1996 | Matz et al. | 401/260 |
| 5,846,012 | 12/1998 | Kudo | 401/206 |

*Primary Examiner*—Helene Klemanski

[57] ABSTRACT

A correction fluid that prevents clogging of the delivery nib of a correction fluid marker separates into liquid and solid phases while not in use, thereby allowing the liquid phase to transport lubricants and anti-oxidants into the nib between uses to restore and preserve the nib. The correction fluid includes a thixotropic gel that soft settles and creates a gelatinized long lasting network of hydrogen bonded fibers in the formulation which are rejuvenated by shaking of the applicator and which do not appreciably agglomerate over time. The correction fluid further includes weak solvents and mild resins which advantageously do not swell the nib fibers or destroy the adhesives in the nib over time. A correction fluid marker 10 for applying the correction fluid includes a hollow barrel 12 having an interior reservoir 18 for holding the correction fluid, and a porous nib 20 held in a sleeve 22 at one end of the barrel in communication with the reservoir. The correction fluid travels through the nib via capillary action and is applied to a print medium from the tip of the nib protruding from the sleeve. A thin seal 26 seals the correction fluid in the reservoir and prevents the correction fluid from contacting the nib prior to the first use of the marker. A mixing slug 24 having a pointed tip ruptures the seal when brought into contact with the seal by shaking the marker at the time of first use. The marker can have a compressible barrel for squeezing out correction fluid, or a rigid barrel containing pressurize correction fluid releasable with a valve mechanism 58, 60.

19 Claims, 3 Drawing Sheets

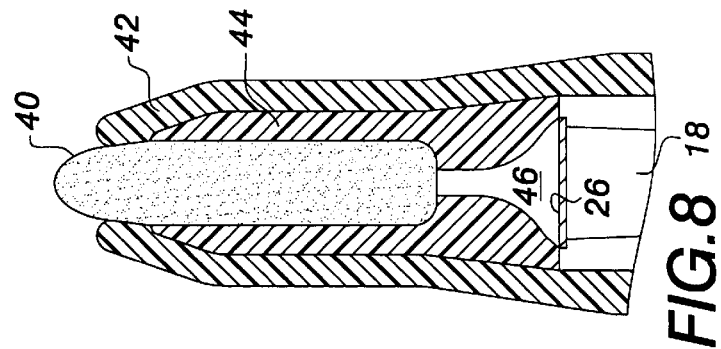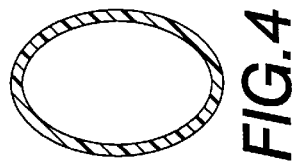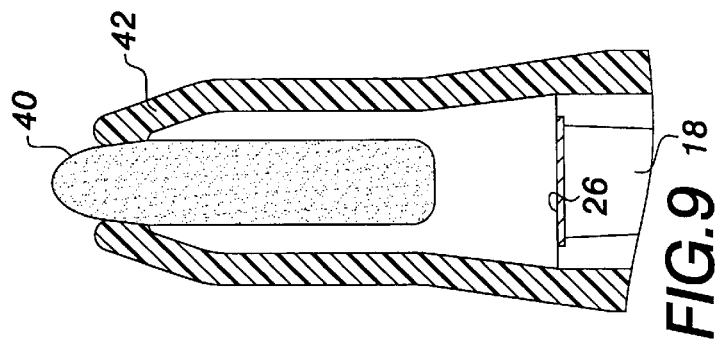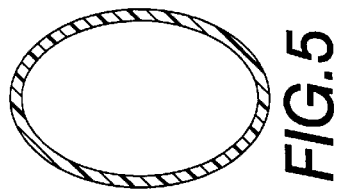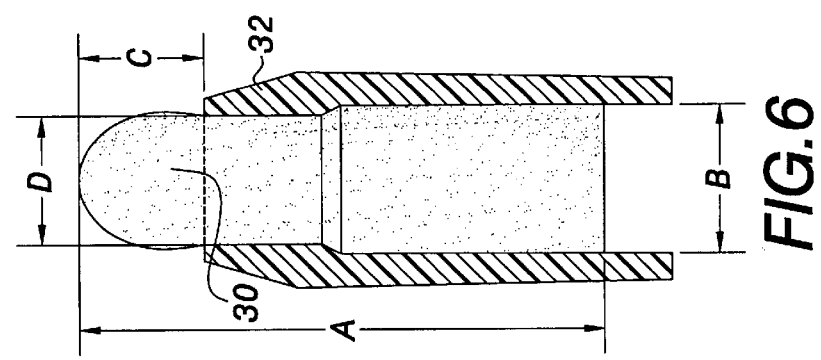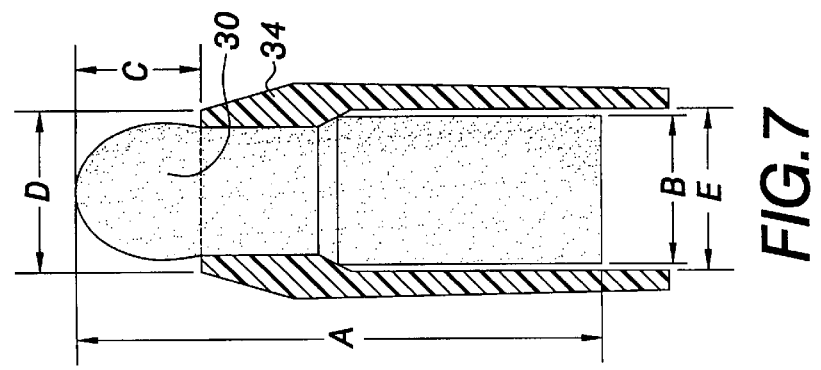

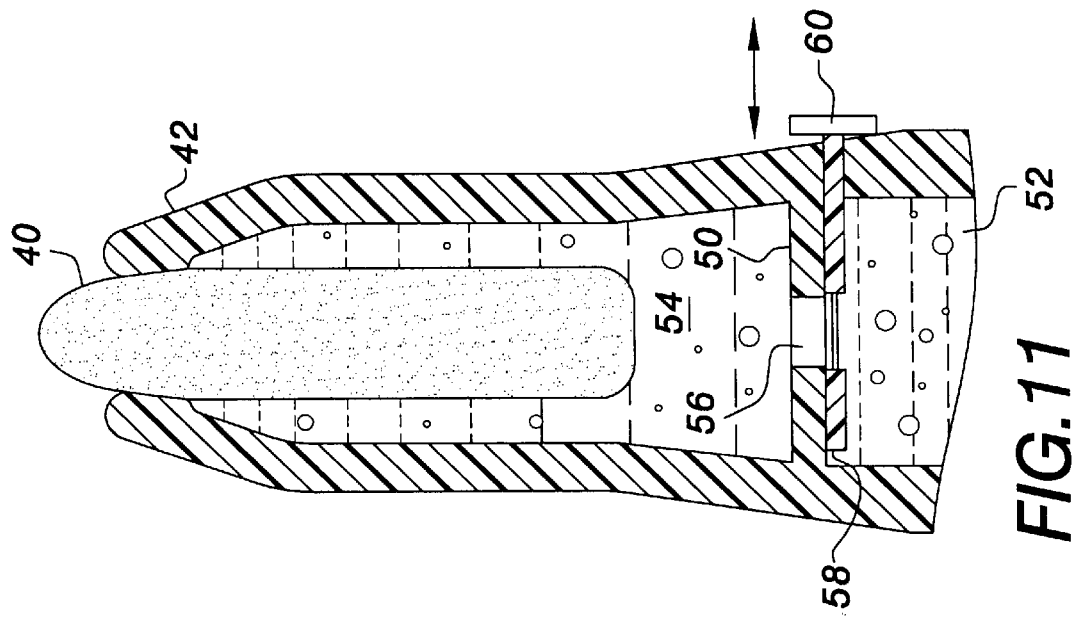
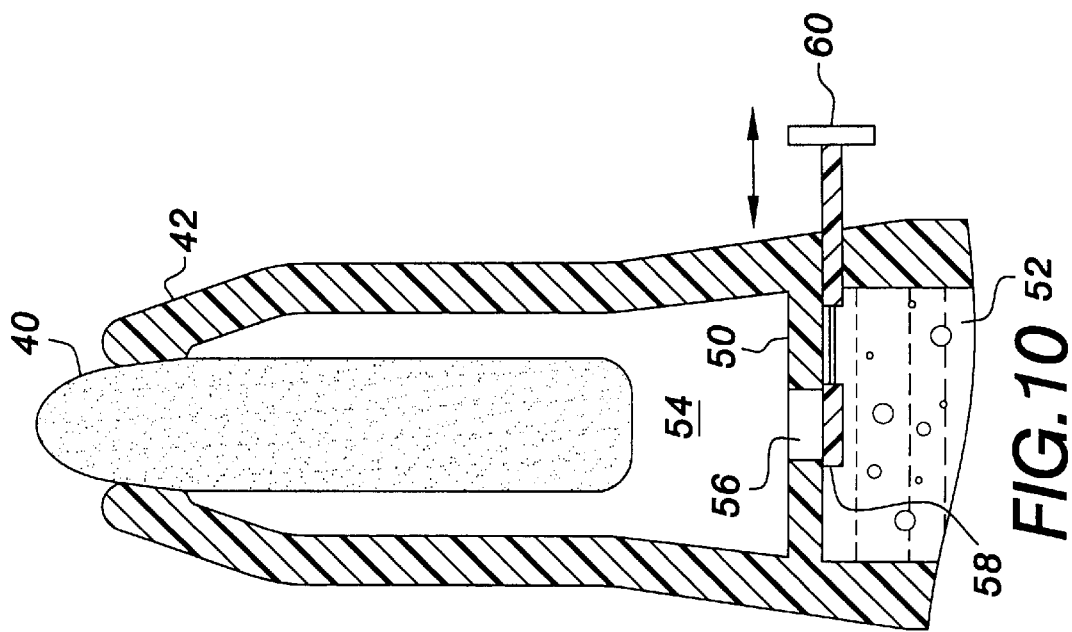

CORRECTION FLUID MARKER AND FORMULATION FOR FLUID

CROSS REFERENCE TO RELATED APPLICATIONS

This application claims priority from: U.S. Provisional Patent Application Ser. No. 60/070,233, entitled "Correction Fluid Formulation and Marking Device," filed Dec. 31, 1997; U.S. Provisional Patent Application Ser. No. 60/070,524, entitled "Correction Fluid Marker and Improved Correction Fluid Formulation," filed Jan. 6, 1998; U.S. Provisional Patent Application Ser. No. 60/070,895, entitled "Correction Fluid Marker and Formulation for Fluid," filed Jan. 8, 1998; and U.S. Provisional Patent Application Ser. No. 60/071,481, entitled "Correction Fluid Marker and Formulation for Fluid," filed Jan. 13, 1998. The disclosures of these provisional patent applications are incorporated herein by reference in their entireties.

BACKGROUND OF THE INVENTION

1. Field of the Invention

The present invention relates to a pen-type or "marker" correction fluid applicator for applying a correction fluid to a print medium to mask markings on the print medium, and to an improved correction fluid formulation for cleaning and preventing clogging of the nib of a correction fluid applicator.

2. Description of the Related Art

Various pen-type or "marker" correction fluid applicator designs have been proposed for the purpose of conveniently applying correction fluid to a print medium, such as a paper surface, in order to mask or obscure handwritten, printed or photocopied markings formed on the paper surface. Such applicators typically include a correction fluid reservoir which stores the correction fluid in a liquid state and a delivery system which permits flow of the correction fluid onto the paper surface in a controlled manner.

For example, U.S. Pat. No. 4,923,317 to Bishop et al., the disclosure of which is incorporated herein by reference in its entirety, discloses a marker-type correction fluid applicator having an applicator tip designed to apply conventional correction fluid to a paper surface. The applicator includes a porous plastic or foam tip and a flow regulator disposed between the tip and a fluid reservoir. The regulator may be formed of a foam material or may include a pressure-actuated valve.

Other known marker-type correction fluid applicators, such as those disclosed in U.S. Pat. Nos. 5,277,510 to Okamoto et al., 5,338,775 to Matz et al., and 5,468,082 to Hori, the disclosures of which are incorporated herein by reference in their entireties, involve the use of spring-biased ball-type applicator tips. More specifically, the ball tip is biased axially outward by a spring valve to seal off flow of correction fluid from a reservoir. When the ball tip is pressed against a surface such as paper, the ball tip is displaced axially inward, thereby allowing correction fluid to flow from the reservoir, around the ball tip and onto the paper.

There has been an increasing interest in the field to formulate correction fluid systems that avoid separation of the liquid and solids of the correction fluid to prevent settling and agglomeration. To that end, thixotropic additives such as clays and bentones have been added to hinder separation and consequent hard coagulation of correction fluids. For example, the aforementioned patent to Matz et al. discloses a correction fluid formulation that is particularly suitable for ball-tip marker correction fluid applicators, wherein the correction fluid is formulated with thixotropic fluids designed to prevent the correction fluid from settling into constituent parts between uses, thereby eliminating the "nuisance" of needing to shake the fluid before use.

U.S. Pat. No. 5,368,810, the disclosure of which is incorporated herein by reference in its entirety, discloses a pen-type correction fluid dispenser having a squeezable tubular body which provides a greater degree of control over the amount of correction fluid dispensed. By pressing a spring-biased plunger against a surface, such as paper, a narrow opening is formed between the plunger and the surrounding wall by displacement of the plunger. The narrow opening is of a size that permits a sufficient flow of correction fluid from the tubular body to the paper only when the tubular body is simultaneously squeezed by the hand.

Attempts to produce pen or marker-type correction fluid dispensing applicators that employ fibrous nib delivery systems have been unsuccessful, because no correction fluid chemical formulations have addressed the problem of the correction fluid clogging the nib and drying on the nib between uses. Further, the need to develop a correction fluid formulated especially for a porous marker nib has not been recognized in the art. Commercially available nibs are typically composed of glued, thermally-bonded, axially-aligned polyester or like materials which are machined or shaped to provide contact points suitable for contacting a print medium, such as paper or other substrate. Typically, a substantially conical or frusto-conical shape is the most desirable shape for the point of the delivery nib of a correction fluid applicator, although other shapes may be utilized for specific applications. The nibs are hard enough so as not to substantially distort during use, but soft enough to provide a smooth application of correction fluid to the print medium.

In conventional use, nibs are designed to be saturated in highly pigmented formulations by being held in a loose plastic housing which allows fluid to flow over the outside of the nib, such that the nibs are not fed by capillary action. Capillary action has so far been successful only in low pigment or dye-based formulations. The reason for this lack of functionality of highly pigmented systems has been presumed to be that the pigments are too large in micron size to proceed through the nib. It has been suggested that lowering the particle size can solve the flow problem. Lowering particle size does provide for short term success; however, these correction fluid formulations rapidly stop working when strong solvents and highly cohesive resins swell the nib fibers and destroy the adhesives used in their manufacture. No known formulations provide a stable correction fluid utilizing weak resins and mild solvents.

A commercially viable correction fluid product must include a correction fluid that does not dry on the nib during repeated use or after short time without a cap. An additional requirement is that the fluid dry quickly, preferably no longer than approximately thirty seconds after application. Unfortunately, these criteria conflict, and existing correction fluid formulations that dry quickly on a print medium also tend to dry on the tip of the nib, thereby cutting off the flow of correction fluid. No formulations that dry quickly on a print medium have been found which do not also readily dry on the tip of the nib.

Another problem associated with correction fluid dispensing applicators is the need to prevent correction fluid from contacting the nib prior to the first use of the applicator by a customer. Attempts have been made to address this problem by employing spring valve systems within the applicator. However, such spring valve systems increase the complexity and cost of the applicator and have been found to be inconvenient.

SUMMARY OF THE INVENTION

It is an object of the present invention to prevent clogging of the delivery nib of a marker-type correction fluid applicator.

It is a further object of the present invention to prevent drying of correction fluid on the delivery nib of a marker-type correction fluid applicator.

It is yet a further object of the present invention to prevent correction fluid from contacting the delivery nib of a marker-type correction fluid applicator prior to the first use of the applicator, without employing costly or inconvenient mechanisms.

It is a still further object of the present invention to provide a correction fluid formulation capable of cleansing the delivery nib of a correction fluid applicator and preventing coagulation of material on the nib.

It is another object of the present invention to formulate a correction fluid that dries quickly on a print medium, provides complete coverage of markings on the print medium, and can be applied smoothly to the print medium.

It is yet another object of the present invention to formulate a correction fluid that is less harmful to the environment and that presents less of a health risk to the consumer.

It is still another object of the present invention to employ separation of correction fluid into liquid and solid components to facilitate delivery of anti-coagulants and cleaning agents to the nib of a correction fluid applicator between uses of the applicator.

A further object of the present invention is to reduce or eliminate the need to squeeze the barrel of a correction fluid applicator by using the heat of the fingers and hand to pressurize the barrel of the applicator.

Yet a further object of the present invention is to formulate a correction fluid with a propellant to facilitate flow of the correction fluid.

The aforesaid objects are achieved individually and in combination, and it is not intended that the present invention be construed as requiring two or more of the objects to be combined unless expressly required by the claims attached hereto.

The correction fluid formulation of the present invention dries rapidly, can be smoothly applied to a print medium, and provides complete coverage of markings while solving the problems of clogging of the delivery nib of the marker and drying of the correction fluid on the delivery nib between uses, without damaging the nib over time. The correction fluid separates into liquid and solid phases when left standing (e.g., between uses) in a closed container, such as a reservoir, thereby allowing the liquid phase to transport anti-coagulants and cleaning agents into the nib between uses to restore and preserve the nib. Specifically, silicone lubricants and anti-oxidant solvent stabilizers are included in the formulation and remain present in the liquid phase of the correction fluid that saturates the nib between uses, and displace the pigments and clear clogged passages in the nib so that the ability of the nib to smoothly apply a sufficient quantity correction fluid to a print medium is not significantly degraded over the lifetime of the applicator. Additionally, the correction fluid includes a thixotropic gel that soft settles and creates a gelatinized long-lasting network of hydrogen bonded fibers in the formulation which are rejuvenated by shaking of the applicator and which do not appreciably agglomerate over time.

The correction fluid formulation of the present invention further includes one or more weak solvents and one or more mild resins which advantageously do not swell the nib fibers or destroy the adhesives in the nib over time. The weak solvents and mild resins provide the addition benefit that they are environmentally less harmful and present less of a health risk to the consumer.

In accordance with another aspect of the present invention, a correction fluid marker for applying correction fluid to a print medium, such as paper, includes a hollow body or barrel having an interior reservoir for holding the correction fluid, and a porous nib held in a sleeve at one end of the barrel in communication with the reservoir. The correction fluid travels through the nib via capillary action and is applied to the print medium from the tip of the nib protruding from the sleeve. Preferably, the sleeve holds the nib in a press fit, thereby preventing the correction fluid from seeping between the sleeve and the nib. The shape and fit of the sleeve determine the amount of outer surface area of the nib directly exposed to the flow of correction fluid from the reservoir, thereby controlling (along with other factors such as pressure) the flow rate of correction fluid through the nib. Optionally, the marker includes a metering orifice disposed between the reservoir and the nib to further restrict and control the flow of correction fluid to the nib.

Between uses, the components of the correction fluid separate into liquid and solid phases. Nib conditioning additives, such as lubricants and anti-oxidants remain in the liquid phase and are transported by the liquid phase of the correction fluid to the nib where they remove pigments, prevent coagulation and clogging of the nib, and lubricate and condition the nib to maintain the nib in good operating condition throughout the lifetime of the marker-type applicator.

A mixing slug disposed within the reservoir facilitates mixing of the components of the correction fluid upon agitation of the marker prior to each use. In accordance with one embodiment, a seal formed of a thin plastic membrane or foil seals the correction fluid in the reservoir and prevents the correction fluid from contacting the nib prior to the first use of the marker. The mixing slug is configured to have a pointed tip that ruptures the seal when brought into contact with the seal by shaking the marker at the time of first use.

The correction fluid applicator can be of the squeezable marker type, having a compressible barrel with a deformable, bulbous section, wherein compression of the barrel causes the correction fluid to flow to the nib and travel through the nib to the print medium. In this case, the seal can be the aforementioned plastic or foil seal rupturable via a sharpened mixing slug, or the seal can be formed of a brittle material, such as glass, that is breakable upon squeezing of the barrel.

In accordance with another embodiment of the present invention, the correction fluid marker includes a valve disposed between the nib and the correction fluid reservoir in a rigid barrel. By opening or closing the valve, flow of the correction fluid from the reservoir to the nib is permitted or prevented. When such a valve is employed, a propellant can be added to the correction fluid to maintain the correction fluid under pressure in the reservoir. The correction fluid within the reservoir can also be pressurized by body heat conducted to the barrel of the marker by the hand and fingers to facilitate flow of the correction fluid to the nib.

The above and still further objects, features and advantages of the present invention will become apparent upon consideration of the following detailed description of specific embodiments thereof, particularly when taken in conjunction with the accompanying drawings wherein like reference numerals in the various figures are utilized to designate like components.

BRIEF DESCRIPTION OF THE DRAWINGS

FIG. 4 is a transverse sectional view of the barrel of the correction fluid applicator shown in FIG. 1 taken near one end of the barrel. FIG. 5 is a transverse sectional view of the barrel of the correction fluid applicator shown in FIG. 2 taken along a squeezable portion of the barrel.

FIG. 6 is a longitudinal sectional view of the nib and nib holder of a correction fluid applicator in accordance with one embodiment of the present invention.

FIG. 7 is a longitudinal sectional view of the nib and nib holder of a correction fluid applicator in accordance with another embodiment of the present invention.

FIG. 8 is a longitudinal sectional view of a nib arrangement employing a metering orifice.

FIG. 9 is a longitudinal sectional view of a nib arrangement wherein no metering orifice is employed.

FIGS. 10 and 11 are longitudinal sectional views of a correction fluid applicator employing a switch-actuated valve mechanism in closed and open positions, respectively, for controlling the flow of pressurized correction fluid from a reservoir to the nib.

DETAILED DESCRIPTION OF THE PREFERRED EMBODIMENTS

Figure 1:
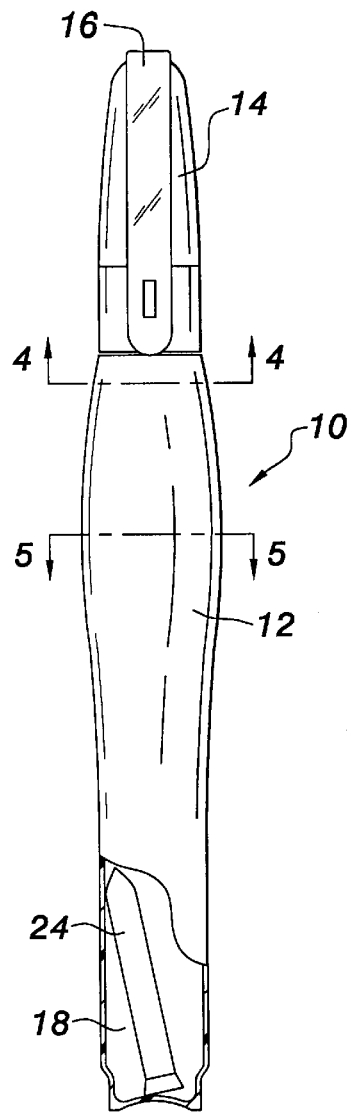
FIG. 1 is a front elevation view in partial section of a correction fluid applicator in accordance with one aspect of the present invention.

In accordance with one aspect of the present invention, an improved correction fluid formulation that dries rapidly, provides complete coverage and can be smoothly applied to a print medium, solves the problems of clogging of the delivery nib and drying of the correction fluid on the delivery nib between uses, without damaging the nib over time. The correction fluid of the present invention separates into liquid and solid phases while not in use, thereby allowing the liquid phase to transport anti-coagulants and cleaning agents into the nib between uses to restore and preserve the nib. More specifically, the correction fluid includes thixotropies that soft settle and create a gelatinized long lasting network of hydrogen bonded fibers in the formulation which are rejuvenated by shaking of the applicator and which do not appreciably agglomerate over time. By way of non-limiting example, the correction fluid can include fumed silica, Goodyear™ resin and castor bean thixotropies in any combination as gelling agents.

Silicone lubricants and anti-oxidant solvent stabilizers are included in the formulation. These additives remain present in the liquid phase of the correction fluid that saturates the nib between uses, and displace the pigments and clear clogged passages in the nib so that the ability of the nib to smoothly apply a sufficient quantity correction fluid to a print medium is not significantly degraded over the lifetime of the applicator. The silicone additive improves the restoration of the nib between uses. Anti-oxidant fuel additives, for example, can be incorporated to prevent oxidation of the volatiles to polymers.

The correction fluid formulation of the present invention includes one or more weak solvents and one or more mild resins which advantageously do not swell the nib fibers or destroy the adhesives in the nib over time. As used herein and in the claims, the term "weak solvent" means a solvent having a kauri-butonal (KB) value of approximately 30 (KB) or less, and the term "mild resin" means a resin that is dissolvable in a weak solvent. The weak solvents and mild resins provide the addition benefit that they are environmentally less harmful and present less of a health risk to the consumer. The aforementioned Goodyear™ thixotropic resin is dissolvable in mild solvents.

Correction fluid formulators have heretofore been unable to develop stable correction fluids utilizing weak solvents and mild resins. Consequently, the correction fluid formulation of the present invention is to be contrasted with conventional formulations, which typically include strong solvents and highly cohesive resins which swell the nib fibers and destroy the adhesives used in the manufacture of the nibs.

Moreover, whereas the current trend in the industry is to develop correction fluids that do not readily separate to liquids and solids to prevent settling and agglomeration, the correction fluid of the present invention takes advantage of the separation of the liquid and solid components of the correction fluid to transport lubricants and anti-oxidant solvent stabilizers to the nib to prevent clogging of the nib.

An example of a specific correction fluid formulation in accordance with one embodiment of the present invention is now described to illustrate the invention.

EXAMPLE

An exemplary correction fluid includes a primary solvent and a secondary solvent. The primary solvent can be any normal heptane aliphatic hydrocarbon with an evaporation rate of, for example, approximately 5.5 and a density in the range of 6 pounds/gallon. The primary solvent is preferably tested for high purity and for low levels of aromatic hydrocarbons. The secondary solvent can be odorless mineral spirits.

The correction fluid of the exemplary embodiment further includes primary and secondary resins. The primary resin can be Goodyear™ Plioway Ultra 200 (Newtonian thermoplastic resin, vinyl acrylate polymer). The secondary Resin can be Goodyear™ Plioway Ultra G20 (Newtonian thermoplastic resin, vinyl acrylate polymer).

The correction fluid also includes primary and secondary thixotropies. The primary thixotropy can be Sud-Chemie Advitrol 100 castor oil derivative, and the secondary thixotropy can be Degussa R-972 or higher grade hydrophobic amorphous fumed silica.

The correction fluid includes a dispersant which can be BYK Chemie BYK-107 hydroxy functional carboxylic acid ester with pigment affixed groups.

The pigment of the correction fluid can be titanium dioxide, such as Kronos 2131 rutile titanium dioxide at least 80% titanium dioxide with aluminum hydroxide and amorphous silica surface treatment preferably manufactured by a sulphate process.

The correction fluid further includes primary and secondary additives. The primary additive can be Lambert F-50 dimethyl silicone (dimethylpolysiloxanes). The secondary additive can be Nocco improved fuel additive composed of napthalates suspending proprietary anti-oxidants similar to BHT and with a blue dye.

It will be understood that the formulation components specified above reflect examples for an exemplary embodiment of the invention, and that other components with similar characteristics and functions may be substituted therefor. For example, other solvents can serve as the primary solvent, including, but not limited to: methylcyclohexane (MCH); aliphatic hydrocarbons $C_8$–$C_{11}$; and isoparaffinnic solvents such as IsoparE™ made by Exxon. An alternative to the Ultra 200 Primary Resin or to the Ultra G20 Secondary Resin could be, for example, Goodyear™=s Plioway EC-1 resin, or the like. Further, the primary pigment could alternatively be any similar titanium dioxide. Other alternative components will be appreciated by persons skilled in the art.

The processing equipment used to formulate the correction fluid can include a high speed dispersor of the Myers type capable of supersonic dissolving of pigment grinds (10 hp and six inch bland) and a secondary media grinder capable of slow speed micronization. A procedure for producing the correction fluid from the foregoing constituents includes the following steps and results in approximately 110 gallons of finished product:

Step 1: In a 100-gallon vat, 250 pounds of heptane is used to dissolve 83 pounds of Ultra 200 resin and one pound of Ultra G20 resin. The mixture is allowed to dissolve at slow speed for a minimum of one hour.

Step 2: Three pounds of BYK-107 are added as the dispersant.

Step 3: 50 pounds of titanium dioxide are added and blended at 1000 RPM for ten minutes.

Step 4: 1.25 pounds of fumed silica are added and blended at 1000 RPM for ten minutes.

Step 5: 300 pounds of titanium dioxide are added (50 pounds every ten minutes over one hour keeping viscosity at no less than 30 seconds as measured on a number four Ford cup viscometer). Approximately 195 additional pounds of heptane are added during this process to keep the fluid in a workable consistency for dispersion.

Step 6: The viscosity is brought to 16.25 seconds using number four Ford cup.

Step 7: 16 pounds of thixotropic gel is added. The gel is made as a mill base prior to addition, as described below.

Step 8: The fluid is dissolved at high speed for two hours.

Step 9: By heptane addition, the viscosity is brought to 16 seconds using number four Ford cup. A total of 444 pounds of heptane will have been added at this point.

Step 10: 45 pounds of fuel additive are added to the fluid. The dispersor is kept at the slowest speed.

Step 11: 8 pounds of silicone mix are added.

Step 12: A previously prepared solution of Ultra G20 resin is added until the viscosity reaches 19 seconds using number four Ford cup. The fluid includes approximately 1 pound of resin for every 6 pounds of heptane.

The mix is removed and placed in a media mill.

Step 13: 4.5 pounds of silicone are added, and the fluid is mixed and agitated in the media mill for one hour.

The aforementioned thixotropic mill base is produced in the following manner.

Step 1: 173 pounds of odorless mineral spirits are placed in a 55-gallon drum.

Step 2: 8 pounds Ultra 200 resin are added.

Step 3: 18 pounds Advitrol 100 are added.

Step 4: The mixture is dissolve at slow speed for 30 minutes.

Step 5: The dissolver is brought to 3000 RPM and 50 pounds of titanium dioxide are added.

Step 6: 50 pounds titanium dioxide are slowly added, with the mixture being stirred to bring the thick paste to the blade. A temperature of 150 degrees F must be obtained for 15 minutes.

Step 7: The mixture is let down slowly with 35 pounds of odorless mineral spirits.

|  | Weight | Percent (%) |
| --- | --- | --- |
| Heptane | 444.00 | 46.40 volatile |
| Titanium Dioxide | 357.40 | 37.30 solid |
| Ultra 200 Resin | 83.30 | 8.70 solid |
| Ultra G20 | 1.80 | 0.20 solid |
| BYK-107 | 3.00 | 0.31 non-volatile |
| Fumed Silica | 1.25 | 0.14 solid |
| Advitrol 100 | 0.70 | 0.08 solid |
| Mineral Spirits | 7.60 | 0.80 volatile |
| Fuel Additive | 45.00 | 4.70 volatile |
| Silicone | 12.50 | 1.30 non-volatile |
| Carbon Black | 0.80 | 0.08 solid |

The correction fluid of the present invention can be applied in any conventional manner to a print medium, such as paper. For example, the correction fluid can be applied using a conventional bottle and brush applicator or any pen-type applicator system, including, but not limited to: rolling ball applicator systems, squeeze bottle systems, and applicators with porous tips, including applicators with nib delivery systems.

The correction fluid formulation of the present invention is particularly advantageous when used with a marker-type correction fluid applicator of the present invention, having a fibrous nib for applying the correction fluid to a print medium. Referring to FIGS. 1–5, an example of a correction fluid marker 10 having a nib delivery system suitable for use with the correction fluid of the present invention is shown. Marker 10 includes a hollow, elongated, generally tubular barrel or body 12 and a removable cap 14 having a clip 16 suitable for affixing the marker to an object, such as a pocket. The interior of hollow tubular body 12 serves as a cavity reservoir 18 for storing the correction fluid. The body 12 and cap 14 can be formed of any conventional material, such as plastic.

Figure 3:
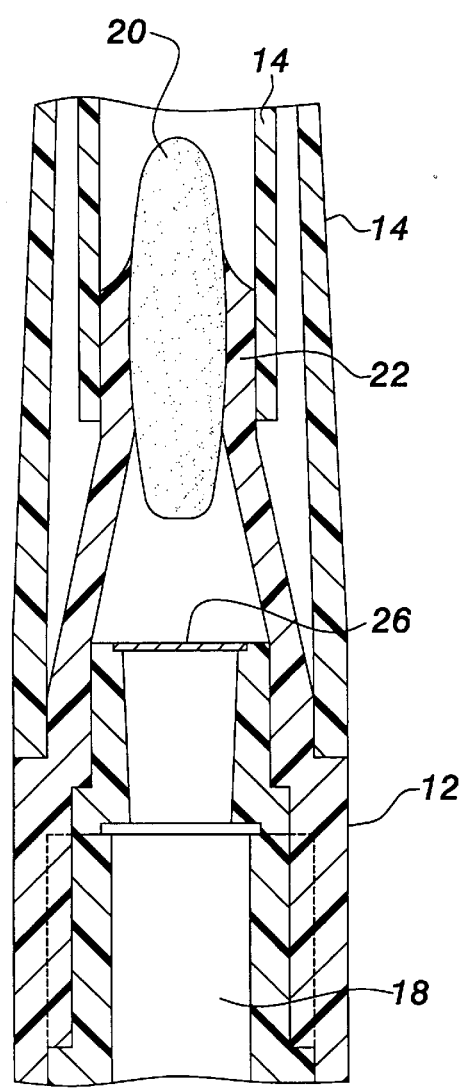
FIG. 3 is a fragmentary sectional view of a portion of the correction fluid applicator shown in FIGS. 1 and 2.
Figure 2:
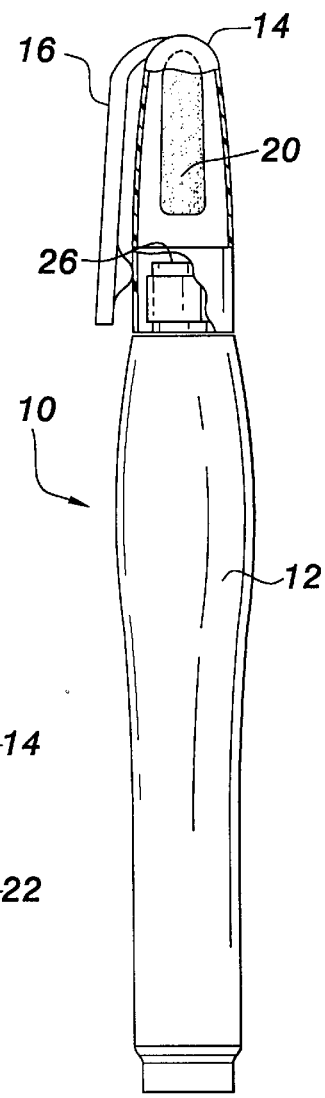
FIG. 2 is a side elevation view in partial section of the correction fluid applicator shown in FIG. 1.

As best seen in FIG. 3, at the end coverable by cap 14, body 12 tapers radially inward to form a distal hollow sleeve 22. A longitudinally elongated fibrous nib 20 is held in sleeve 22 and protrudes therefrom, such that the distal end of nib 20 can readily contact a print medium at a wide range of angles when the body 12 of marker 10 is held in the hand. Nib 20 can be a commercially available bonded fiber nib and is generally cylindrical with a rounded, conical or frustoconical distal end. Inboard of the longitudinal end, nib 20 is circumferentially encased over a portion of its length by sleeve 22, such that correction fluid cannot seep between sleeve 22 and nib 20. At least a portion of nib 20 extends into or is in communication with cavity reservoir 18 such that correction fluid in reservoir 18 can be absorbed into nib 20 and carried to the distal tip of nib 20 via capillary action for application to a print medium.

Because the correction fluid of the present invention readily settles into liquid and solid constituents upon standing in a closed container, mixing of the correction fluid is required prior to each application by shaking the marker. A mixing slug or agitator 24 is disposed within reservoir 18 to facilitating mixing of the correction fluid upon shaking of marker 10.

Between applications, when the marker remains stationary for a period of time and upon standing of the correction fluid in the reservoir, the correction fluid of the present invention advantageously separates into a resoluble network of pigment, resin, additives, and thixotropies and an excess of volatile solvent which contains additives that are transported to the nib via capillary action and treat the nib to enable the nib last over a long period of time. Specifically, the thixotropic formulations separate from the formula and cleanse the nib of coagulating dried material and restore the nib to achieve long life and sustained capillarity.

Because the separating correction fluid of the present invention prevents clogging and drying of correction fluid on a fibrous nib, the correction fluid of the present invention makes it possible to use standard, commercially available bonded fiber nibs and tube containers, such as those found in paint markers to form a correction fluid marker having a simple, inexpensive construction.

Referring to FIG. 3, in accordance with a novel aspect of the present invention, to prevent the nib from contacting and absorbing correction fluid prior to the first use of the marker, a thin diaphragm or seal 26 formed of thin plastic membrane or foil is disposed in the interior of body 12 and extends transversely across a mouth of reservoir 18 near the tapered portion of body 12, thereby completely blocking passage of the correction fluid in reservoir 18 and preventing correction fluid from reaching nib 20. As shown in FIG. 1, the mixing slug 24 disposed within reservoir 18 has a sharpened, pointed tip capable of piercing the seal 26 when the marker is shaken at the time of first use. Once the pointed slug agitator 24 punctures the seal 26, the correction fluid can flow freely to the nib 20. Additionally, the sharpened slug agitator 24 helps to keep the back of the nib 20 open to passage of correction fluid where some dried fluid may have a tendency to accumulate. It will be understood that the use of a pointed mixing slug is not limited to use in dispensers of correction fluid, and a pointed slug can be used in any marker where it is desirable to prevent marking fluid from contacting a porous nib or tip prior to the first use of the marker (e.g., in a felt tip pen, highlighter, etc.).

Thus, while the trend in the industry is to eliminate the need for an agitator or mixing slug by formulating correction fluid that does not separate upon standing, the present invention takes advantage of the separation of the correction fluid to clean and maintain the delivery nib, and the mixing slug used to agitate the correction fluid is configured to rupture a sealing membrane that prevents the delivery nib from absorbing correction fluid prior to the first use of the correction fluid marker, thereby further serving to preserve the nib.

Marker 10 can be of the compressible type, wherein the internal pressure in reservoir 18 is increased by pressing inward on (i.e., squeezing) body 12 with the hand, thereby forcing the correction fluid out of reservoir 18 through nib 20 and onto the print medium. Referring to FIGS. 1, 4 and 5, the transverse cross section of body 12 is shown at two different points along it length. Specifically, body 12 has a generally elliptical transverse cross section, with a greater transverse cross-sectional area taken along section line 5 (FIG. 5) than along section line 4 (FIG. 4) which lies closer to the sleeve end of body 12, resulting in a bulbous portion or bulge in body 12 (FIG. 1). The wall of body 12 can be made thinner in the vicinity of the bulge to facilitate deformation of body 12 when squeezed in the bulge region. It will be understood that body 12 need not be of the squeezable type, and body 12 can formed of a rigid, non-deformable material. Further, body 12 is not limited to an elliptical transverse cross-sectional shape, and can have any suitable transverse cross-section shape and dimension, e.g., round. Advantageously, when application of correction fluid is completed and squeezing force is no longer applied to the body, pressure in the reservoir decreases below the ambient pressure as the body returns to its original shape and volume. This decrease in pressure tends to drawn the correction fluid out of the nib and back into the reservoir cavity, thereby helping to prevent clogging of the nib by removing at least a portion of the correction fluid from the nib immediately after use.

In accordance with the compressible barrel embodiment, the aforementioned seal and pointed slug arrangement can be used to prevent correction fluid from contacting the nib prior to the first use. Alternatively, the seal can be formed of a brittle material, such as glass, that ruptures when the barrel of the marker is first squeezed.

In accordance with another embodiment of the present invention, at least a portion of the nib is press fit into the sleeve serving as a nib holder. Referring to FIG. 6, a nib 30 having a length A and a diameter B (under unpressed conditions) is press fit in the interior opening of a hollow, generally tubular nib holder sleeve 32. In the vicinity of the distal end of sleeve 32 (i.e., the end from which nib 30 protrudes a distance C), sleeve 32 has a inner diameter D than is slightly less than the unpressed diameter B of nib 30, thereby forming a press fit with nib 30. For example, the length A, diameter B and protrusion distance C of nib 30 can be approximately 0.85 in., 0.167 in. and 0.2 in., respectively, with the inner diameter of sleeve 32 having a diameter C of approximately 0.146, thereby forming a press fit of 0.021 in. It is to be understood that these and the following dimensions are provided by way of example only and are not in any way limiting on the scope of the invention. The novel press fit of the nib of the present invention, which has heretofore not been used with fibrous nibs, prevents seepage of fluid between the sleeve and nib. Instead, correction fluid from the reservoir is transported through the nib to the nib tip via capillary action.

In accordance with the embodiment shown in FIG. 6, the region of the press fit extends longitudinally along nib 30 over a length no greater than the nib diameter. Accordingly, the nib holder sleeve 32 has the press fit inner diameter D over at most a length B in the longitudinal direction at the distal end of sleeve 32. Over the remaining length of sleeve 32, the inner diameter of sleeve 32 surrounding nib 30 is greater than press fit diameter D. For example, the inner diameter of sleeve 32 over the remain length of nib 32 can be substantially equal to or greater than the unpressed diameter B of nib 30. In the embodiment shown in FIG. 6, the inner diameter of sleeve 32 is approximately equal to the diameter B of nib 30 over the remaining length of nib 30 (i.e., inboard of the press fit region). In this case, correction fluid from the reservoir cavity initially contacts the nib only along the transversely extending inboard end surface of the nib.

In another embodiment shown in FIG. 7, the inner diameter of sleeve 34 is a diameter E that is slightly greater than the diameter B of nib 30 over the remaining length of nib 30. For example, diameter E can be 0.2 in. In this case, correction fluid from the reservoir can flow along the sides of the nib up to the press fit region, thereby creating a greater initial contact and absorption area that includes the inboard transverse end and longitudinal peripheral surfaces of the nib. In this manner a greater quantity of correction fluid can be absorbed and transported through the nib in a given time period.

In accordance with another embodiment of the present invention, a correction fluid applicator includes a nib 40 press fit in a sleeve 42 at the distal end of the body. To control the flow of correction fluid to the tip of nib 40 protruding from sleeve 42, a metering orifice 44 is disposed within sleeve 42 inboard of the press fit region and between the inner wall of sleeve 42 and nib 40. The outer surface of metering orifice 44 conforms to the inner surface of sleeve 42, and the inner surface of metering orifice 44 forms a press fit with the longitudinal sides of nib 40. Metering orifice 44 further includes a funnel-shaped opening 46 having a wide end aligned with the rupturable seal 26 and a narrow end in communication with the transversely extending inboard end of nib 40. Opening 46 provides a passage for correction fluid to travel from cavity 18 to nib 40, with the shape and size of opening 46 controlling the contact area and hence flow volume of correction fluid through nib 40. Absorption and flow of correction fluid increases with increased surface area of the nib having direct contact with correction fluid flowing from cavity 18, with maximum flow resulting from a complete absence of a metering orifice (FIG. 9) such that the correction fluid surrounds the nib.

In accordance with another aspect of the present invention, the correction fluid formulation of the present invention is compatible with common aliphatic propellants, such as butane or isopropane, which have low kauri butonal values below approximately 27 KB. These propellants are numerous and are commonly included in spray paints. When they are added to the correction fluid formulation, these propellants do not clog the nib but allow for a non-squeeze application when coupled with a flow stop or control. This design allows a rigid body tube or bottle to be used which the consumer need not squeeze.

Referring to FIGS. 10 and 11, in accordance with another embodiment of the present invention, a correction fluid marker having a valve system for dispensing a pressurized correction fluid is shown. A transverse retaining wall 50 separates a reservoir cavity 52 from a separate chamber 54 in communication with nib 40 within sleeve 42. An aperture 56 extends through wall 50 from cavity 52 to chamber 54. A normally closed valve 58 blocks aperture 56, thereby preventing pressurized correction fluid from flowing into cavity 54 and contacting nib 40. As shown in FIG. 11, when correction fluid is to be dispensed, a switch mechanism 60 opens valve 58 to allow fluid under pressure to enter chamber 54 and travel through the nib 40. The valve mechanism can be a press button spool valve or other switch capable of conveniently opening and closing the aperture of the reservoir.

Several variations of nib applicators are capable of providing a shut-off of the nib prior to use including a currently available valve system developed by NAGL Manufacturing Co., Inc. of Omaha, Nebr. The NAGL design has the additional benefit of preventing fluid from flowing into the nib each time the cap is screwed back on.

In accordance with another, optional, aspect of the present invention, the heat of the hand can be used to pressurize the barrel of the applicator, thereby causing the fluid contained therein to expand and force itself through the nib. Heat pressurization can be used with any of the other mechanisms for facilitating correction fluid flow disclosed herein. For example, heating by the hand can be used in conjunction with squeezing of the barrel to reduce the amount of squeezing required to provide a sufficient flow, or heating by the hand can be used to eliminate the need the squeeze the barrel altogether. When employing heat pressurization, the material from which the barrel is formed is preferably a good conductor of heat to achieve a maximum amount of pressurization.

Having described preferred embodiments of a correction fluid marker and formulation for fluid, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A correction fluid composition comprising components that separate into plural phases upon standing in a closed container, wherein the plural phases include a liquid phase having a lubricant and an anti-oxidant that prevents coagulation of the correction fluid.

2. The correction fluid composition of claim 1, wherein said lubricant is a silicone lubricant.

3. The correction fluid composition of claim 1, wherein said anti-oxidant is a fuel additive.

4. The correction fluid composition of claim 1, wherein said components include:
   a solvent;
   a resin dissolvable in said solvent;
   a thixotropic gel;
   a pigment;
   a dispersant; and
   said lubricant and said anti-oxidant.

5. The correction fluid composition of claim 4, wherein said solvent is a weak solvent and said resin is a mild resin.

6. The correction fluid composition of claim 5, wherein said solvent comprises at least one of: heptane; odorless mineral spirits; methylcyclohexane; an aliphatic hydrocarbon $C_8$–$C_{11}$; and an isoparaffinnic solvent.

7. The correction fluid composition of claim 4, wherein said thixotropic gel comprises at least one of: a castor oil derivative; and fumed silica.

8. The correction fluid composition of claim 4, wherein said pigment is titanium dioxide.

9. The correction fluid composition of claim 4, wherein said lubricant is a silicone lubricant.

10. The correction fluid composition of claim 4, wherein said anti-oxidant is a fuel additive.

11. The correction fluid composition of claim 1, further comprising a propellant.

12. The correction fluid composition of claim 11, wherein said propellant is an aliphatic propellant having a kauri butonal value of less than approximately 27 KB.

13. A method of manufacturing a correction fluid composition, comprising the steps of:
   a) dissolving a resin in a solvent;
   b) blending in a dispersant;
   c) blending in a pigment;
   d) blending in a thixotropic gel;
   e) blending in a lubricant; and
   f) blending in an anti-oxidant that prevents coagulation of the correction fluid.

14. The method of claim 13, wherein step a) includes dissolving a mild resin in a weak solvent.

15. The method of claim 14, wherein step a) includes dissolving the mild resin in at least one of: heptane; odorless mineral spirits; methylcyclohexane; an aliphatic hydrocarbon $C_8$–$C_{11}$; and an isoparaffinnic solvent.

16. The method of claim 13, wherein step c) includes adding titanium dioxide.

17. The method of claim 13, wherein step d) includes adding at least one of: a castor oil derivative; and fumed silica.

18. The method of claim 13, wherein step e) includes adding a silicone lubricant.

19. The method of claim 13, wherein step f) includes adding a fuel additive.

* * * * *